Dec. 17, 1940.　　　E. J. DILLMAN　　　2,225,587
CONTROL DEVICE
Original Filed Aug. 5, 1937
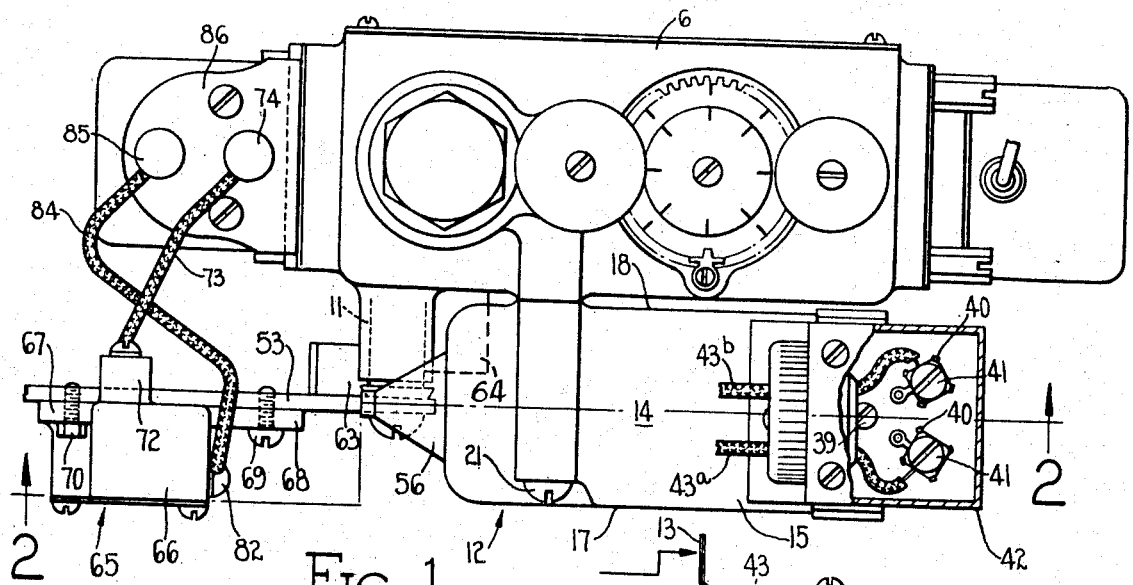
FIG.-1
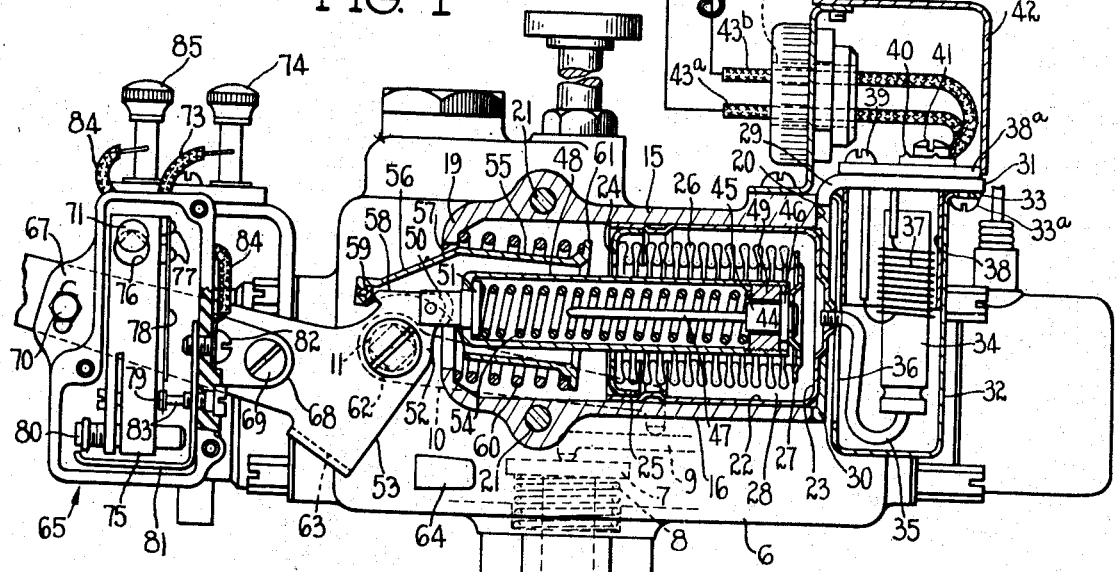
FIG.-2
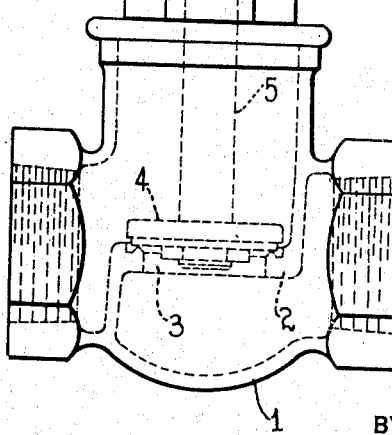
INVENTOR
Earnest J. Dillman
BY
Andrew K. Foulds
his ATTORNEY Patented Dec. 17, 1940

2,225,587

UNITED STATES PATENT OFFICE 2,225,587

CONTROL DEVICE

Earnest J. Dillman, Detroit, Mich., assignor to Detroit Lubricator Company, Detroit, Mich., a corporation of Michigan Original application August 5, 1937, Serial No. 157,585. Divided and this application September 16, 1938, Serial No. 230,246

10 Claims. (Cl. 200—83)

My invention relates generally to new and useful improvements in devices for controlling the operation of flow controlling means or an electric switch or the like.

One object of my invention is to provide novel means for operatively connecting an actuator or power means to an element to be operated thereby.

Another object is to provide a power means or actuator of novel construction and which will be efficient in operation.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Figure 1 is a top plan view of an apparatus embodying my invention, and

Fig. 2 is a side view partly in section on the line 2—2 of Fig. 1, but showing diagrammatically an automatic control switch and its circuit.

Referring to the drawing by characters of reference, I designates generally a valve housing or body having a passageway therethrough with a portion 2 having a valve port 3. Cooperable with the portion 2 and operable to close the port 3, is a valve member 4 having a stem 5 which extends upward into a control housing or casing 6 and terminates in a head 7. A helical coil spring 8 surrounds stem 5 and is held under compression between the wall of casing 6 and the head 7, so that the spring is acting to move or lift the valve member 4 to open the port 3. Movement of the valve member 4 toward open position is opposed by lever mechanism including a lever 9 which bears at its free end upon the head 7 and a lever 10 acting on the lever 9 and carried by a shaft 11.

Mounted on the casing 6 there is a power means or heat motor 12 that actuates the valve member 4 through operation of the lever member 10, the heat motor being controlled by the room thermostat 13. When the room thermostat is dissatisfied the heat motor acts to permit the valve member 4 to be moved to open position by the coil spring 8, and when the thermostat becomes satisfied the heat motor acts to seat the valve. The heat motor includes a casing 14 that is preferably a hollow, tubular casting having a top wall 15, bottom wall 16, side walls 17, 18 and end walls 19, 20. The side wall 18 is disposed toward and adjacent the side wall of the main casing 6 and the two casings may be secured together by screws 21, or by other suitable means. The heat motor includes a power element which in turn includes a tubular, sheet metal casing 22 that telescopes or slidably fits into the casing 14. The casing 22 has an end wall 23 disposed substantially flush with the end wall 20 which has an opening through which the casing 22 is positioned within casing 14. The other and inner end of the casing 22 is open and terminates substantially midway between the end walls of the casing 14, and disposed within the casing 22 adjacent its open end there is a plate member 24 that extends substantially transverse to the side wall of casing 22. The plate member 24 is formed having an annular inturned flange 25 that conforms in contour and positions with its outer periphery flat against the inner side wall of the power element casing 22. The flange 25 may be secured to the inner wall surface of casing 22 by solder, or by other suitable means, to provide a fluid-tight joint therebetween. The plate member 24 is provided with a centrally disposed aperture therethrough and secured and hermetically sealed to a border portion of the plate, around its aperture, is one end of a bellows member 26. The bellows member 26 extends longitudinally and concentrically into the casing 22 having its other or free end disposed toward the casing end wall 23. Secured and hermetically sealed to the free end of the bellows 26 is a movable wall or plate member 27. The bellows member 26 and the casing 24 cooperate to provide an hermetically sealed, expansible chamber 28.

Secured to the end wall 20 of casing 14 there is an L-shaped bracket 29 that has a vertically extending plate portion or leg 30 overlying and closing the opening in end wall 20. The bracket 29 may be secured to the casing 14 by screws, or by other suitable means. The inner face of the plate portion or leg 30 abuts the outer face of the chamber end wall 23 and is preferably secured thereto by solder, or by other suitable means, to prevent inward movement of the casing 22. The L-shaped bracket 29 has a horizontally and outwardly extending plate portion or leg 31 at its upper end, and secured to and depending from the underside of the horizontal leg 31 there is a tubular casing 32. The upper end of the tubular casing 32 is open and has an annular flange 33 that seats against the underside of the horizontal bracket or leg 31. The annular flange 33 may be provided with apertures to receive screws 33ª for rigidly securing the tubular casing 32 to the bracket 29. Disposed within the casing 32 and extending longitudinally thereof is a bulb element 34 that is connected in communication with the expansible chamber 28 by a conduit or tube 35. A slot 36 is provided in the side wall of the bulb element casing 32, extending longitudinally or vertically thereof, through which the tube 35 projects externally of the casing for connection to the chamber 28 through the chamber end wall 23. The bulb 34, expansible chamber 28 and connecting tube 35 provide a closed system that is charged with a temperature responsive, expansible-contractible fluid such as methyl chloride.

Surrounding or wrapped around the bulb element 34, adjacent the upper end thereof, is a coil of wire 37 having a high resistance to flow of current therethrough so as to generate heat. Disposed within the casing 32 and surrounding the coil of resistance wire 37 there is preferably provided a polished metallic reflector 38 for reflecting the heat given off by the resistance coil and directing the heat toward the temperature responsive bulb 34. The heat generated by current passing through the resistance coil 37 heats the fluid in bulb 34 and the fluid expands, exerting its force to compress the bellows 26. Mounted on the horizontal bracket leg 31 there is a block of electric insulating material 38ᵃ which may be formed of Bakelite, or other suitable material, and which may be secured to the leg 31 by screws 39, or by other suitable means. Secured in the insulating block 38ᵃ there is a pair of terminal posts 40 to which the ends of the resistance wire 37 are attached and may be secured by solder, or by other suitable attaching means. The terminal posts each have a binding post in the form of a screw 41. Overlying the block 38ᵃ and enclosing the terminal posts 40 there is a conduit outlet box 42 having an outlet opening 43. Clamped by and extending from the binding post screws 41, there are lead wires 43ᵃ and 43ᵇ which lead to any suitable source of current supply for energizing the heating coil 37. The automatic switch 13 is positioned in the wire 43ᵇ in series circuit with the coil 37 such that when switch 13 is closed and calling for heat, the circuit to the coil 37 will be completed thereby opening the valve member 4.

The movable bellows end wall 27 is provided with a centrally disposed aperture for receiving an end portion of a tubular shaped, longitudinally bored fitting or plug 44 that is secured thereto. The fitting 44 has a shank portion 45 that projects into the bellows 26 and has an intermediate, annular flange 46 that seats against the inner face of the movable wall 27. The fitting 44 may be rigidly secured to the end wall 27 in a leak-proof manner by peening over the end portion of the fitting to clamp the movable end wall 27 tightly between the flange 46 and the peened over portion. Secured and sealed in the bore of the fitting 44 is one end of a filler tube 47 through which the expansible-contractible fluid is introduced into the pressure chamber 28. After the fluid has been introduced into the pressure chamber 28 the tube 47 is severed and the severed end sealed by solder, or by other suitable sealing means.

Disposed within the casing 14 and extending longitudinally thereof is a thrust member which includes a rigid tube 48 having an end portion extending centrally into the bellows 26 and surrounding the filler tube 47 and the fitting 44. An inner end portion of the rigid tube 48 is internally threaded to receive an externally threaded tubular abutment member or collar 49 that abuts the flange 46. The diameter of the bore through the tubular abutment member 49 is larger than the diameter of the fitting shank 45 to permit lateral movement or canting of the rigid tubular member, for a purpose to be hereinafter described. The other or outer end of the tubular member 48 is disposed adjacent the casing end wall 19 and has a connecting member or link 50. The tubular member 48 has at its outer end an end wall provided with a centrally disposed aperture through which the connecting member 50 extends, the connecting member having a circumferential annular flange or head 51 positioned in the tubular member 48 and adapted to abut the inner face of the end wall thereof. The connecting member 50 projects externally of the tubular member 48 and its outer end is bifurcated to receive an upstanding arm portion 52 of a lever member 53. The lever member portion 52 and the bifurcated end portion of the connecting member 50 are provided with aligned apertures to receive a pivot pin for pivotally connecting the lever member 53 and the connecting member 50. Disposed within the tubular member 48 and extending longitudinally thereof is a helical coil spring 54 which has one end in abutment with the head 51 of the connecting member 50 and its other end in abutment with the abutment member 49 of tubular member 48. The coil spring 54 is under compression and acts to maintain the head 51 in engagement with the end wall of tubular member 48. The connecting member 50 is movable inward relative to the rigid tube 48 so that in the event the lever member 53 is manually operated when the bellows 26 is under pressure, the bellows will not be injured.

Disposed within the casing 14 adjacent the end wall 19 thereof is a holding means which includes a tubular member 55 that opposes the heat motor and acts to seat and hold the valve member 4 seated. The tubular member 55 has an outer end portion 56 which is preferably conical in shape and projects externally of the casing 14 through an opening 57 in the end wall 19 of the casing. The conical shaped end portion 56 has an opening in its underside through which the upwardly extending lever arm portion 52 projects into the tubular member 55 for engagement with link 50. The arm portion 52 has an extended portion 58 that extends outwardly away from link 50 and toward the apex of the conical shaped end portion 56, the end of the extended portion 58 terminating in a knife edge which bears against a seat member 59 that is secured in the conical portion substantially at the apex thereof. Surrounding the tubular member 55 within the casing 14 there is a helical coil spring 60 that has one end abutting the inside face of wall 19 and its other end abutting an external annular flange 61 formed on the inner end of the tubular member 55. The coil spring 60 is under compression and acts to move the tubular member 55 inwardly to pivot the lever member 53 in a clockwise direction. Pivotal movement of the lever member 53, which is carried by the external square end 62 of shaft 11, acts to rotate in a clockwise direction the shaft 11 and lever member 10 until the valve member 4 is seated, the spring 60 holding the valve member seated until overcome by the heat motor.

When the heating coil 37 of the heat motor is energized, the fluid in bulb 34 will be heated and will expand, with accompanying increase in pressure acting to expand the chamber 28 and compress the bellows 26. When the force exerted by the expanded fluid acting on the bellows 26 overcomes the opposing force exerted by the spring 60, the bellows will be compressed and move the thrust member outward to rotate the lever member 53 in a counterclockwise direction, which will move lever 10 away from the lever 9 and the valve member head 7 permitting spring 8 to move the valve to open position. The lever member 53 is formed having a lateral flange 63 at its lower edge for abutment with an external boss 64 formed on the side wall of the main casing 6 to limit pivotal movement of lever 53 when the lever is actuated by the heat motor.

Carried by the lever 53 which is substantially in the form of a bell crank and on the free arm thereof, there is a tilt or pendulum switch 65 having a housing or casing 66 of substantially rectangular form and of electric insulating material. The casing is provided with oppositely extending, external ears or flanges 67, 68 which lie flat against the side face of the lever arm and are secured thereto by screws 69, 70, the screw 70 passing through a substantially vertical slot in flange 67 so that the casing 66 can be rotated or adjusted in a vertical plane relative to its supporting lever arm. Projecting into the casing 66 from its rear wall and positioned adjacent its upper end, there is a supporting member 71, preferably a rod or pin of electric conducting material having within the casing and intermediate its ends an upwardly directed knife edge or bearing. The member 71 terminates at its outer end flush with the outer face of a supporting boss 72 and has secured thereto a lead wire 73 which extends to a terminal post 74 for connection to a lead wire running to a suitable source of current supply. Pivotally supported on the bearing edge of pin 71 there is an oscillatory member or pendulum 75 having a bearing aperture 76 which receives the inner end of pin 71 so that the member 75 is free to swing in a vertical plane substantially parallel to the plane of movement of the lever member 53. Secured to the upper end portion of the member 75 and to the side face parallel to pin 71 by screws 77, there is a downward extending, metallic switch arm 78 of flexible, resilient material having adjacent its lower end a contact member 79. At the lower end of the member 75 beneath the contact member 79 there is a horizontally extending bar magnet 80, cooperable with a metallic armature member in the form of a plate or strip 81 secured to the internal side wall of casing 66 by a screw 82 and extending substantially parallel to the switch arm 78. Adjustably screw-threaded through the armature member 81 there is a contact member 83 cooperable with and engageable by the movable contact member 79. The contact member 83 is connected at screw 82 to a lead wire 84 which extends to a terminal post 85. The terminal posts 74 and 85 are insulated from and carried by a bracket arm 86 supported by the end wall of the casing 6.

The operation of my control device is as follows: When the room thermostat 13 calls for heat and completes the electric circuit to the resistance heating coil 37, the volatile liquid in the bulb element 34 will be discharged therefrom under pressure into the bellows expansion chamber 28. The force exerted by the liquid entering chamber 28 will compress the bellows member 26, thereby moving the plunger 48 outward or toward the left, facing Fig. 2. As the plunger 48 is moved outward, the spring 54 will hold link 50 against the plunger end wall to rotate lever member 53 counterclockwise on its shaft 11 and against the force of the return spring 60, the tubular member 55 rocking to permit this movement as the spring 60 is compressed. This rotation of lever member 53 will move its free, switch-carrying arm downward, causing the supporting bearing edge for pendulum 75 to move toward the left with the result that the pendulum 75 will swing or rotate toward the left when the attractive force of magnet 80 for its armature 81 is overcome by the weight of the pendulum. As the pendulum 75 moves toward the left by force of gravity, the contact member 79 will be moved quickly out of engagement with the fixed contact member 83, thereby breaking the circuit controlled by the tilt switch. This rotational movement of lever member 53 by expansion of the bellows chamber will also lift the lever arm 10 away from lever arm 9 so that the valve opening spring 8 can lift the valve member 4, thereby opening the valve port 3. When the room thermostat 13 becomes satisfied and breaks circuit to coil 37, then as the bulb element 34 cools, the liquid in chamber 28 will be forced back into the bulb by the spring 60 which by its interconnection with the lever member 53 through the tubular member 56 will return the tilt switch to the position shown, thereby moving contact member 79 into engagement with fixed contact member 83 and will also force the valve member 4 to its seat by means of the inter-engaging levers 10 and 9 which act on the valve stem.

This application is a division of my copending application, Serial No. 157,585, filed August 5, 1937, for Control device.

What I claim and desire to secure by Letters Patent of the United States is:

1. A control device comprising a supporting means, a movable controlling means, a power element for moving said controlling means to one position, a thrust member actuated by said power element and having operative connection with said controlling means, a tubular thrust member surrounding said first-named thrust member and having operative connection with said controlling means, and yieldable means acting on said tubular thrust member and operable to move said controlling means to a second position.

2. A control device for actuating a movable controlling means comprising a casing, a power element including means disposed within said casing providing an expansible chamber, a thrust member disposed within said casing and actuated by said power element to move said controlling means in one direction, said thrust member having operative connection with said controlling means, a tubular thrust member disposed within said casing and surrounding said first-named thrust member, said tubular thrust member having operative connection with said controlling means, and spring means disposed within said casing and operable through said tubular thrust member to move said controlling means in an opposite direction.

3. In a control device, a movable controlling means, a lever member connected thereto, a supporting member, a power element supported by said supporting member and having a thrust member connected to said lever member, said power element being operable through said thrust member to move said controlling means to one position, a rockable tubular thrust member having operative connection with said lever member and surrounding said first-named thrust member, and means acting through said tubular thrust member and said lever member for moving said controlling means in an opposite direction.

4. In a control device, a movable controlling means, a lever member operatively connected thereto for movement thereof, a supporting means, a power element supported by said supporting means and having a thrust member connected to said lever member, said power element being operable through said thrust member to move said lever member thereby positively to move said controlling means to one position, a rockable tubular thrust member having operative connection with said lever member and surrounding said first-named thrust member, means acting through said tubular thrust member and said lever member for moving said controlling means in an opposite direction, and a switch means carried by said lever member and operable to control a circuit in accordance with the operation of said controlling means, said lever member being so constructed and arranged relative to said controlling means that failure of said controlling means to move to said one position will hold said lever member thereby to render said power element ineffective to control said circuit.

5. In a control device, a mechanism casing, a power means casing carried by said mechanism casing, an operating shaft extending through the wall of said mechanism casing and having a portion extending external of said wall and adjacent one wall of said power means casing, an actuated means, means operatively connecting said shaft and said actuated means, power means within said power means casing, a lever carried by said shaft adjacent said one power casing wall, means operatively connecting said power means to said lever and extending through an aperture in said one power casing wall adjacent said lever, and means in said power means casing having a portion extending through said one power casing wall, said last-named means portion being connected to and acting on said lever to oppose movement of said lever by said power means.

6. In a control device, a housing, a container within said housing and rigid therewith, a bellows member closing one end of said container to provide a pressure chamber, a thrust member extending from said bellows member, a lever external of said housing and operatively connected to said thrust member, a thrust member connected to said lever and having a portion within said housing and a portion external of said housing, a helical coil spring within said housing and having one end portion engaging said second-named thrust member, said spring surrounding and opposing movement of said first-named thrust member, and means rigid with said container and engaged by the other end portion of said spring.

7. In a control device, a tubular housing member having a transverse inward directed abutment, a container fitted within said housing and having a movable end wall providing a pressure chamber, a thrust member extending from said wall and longitudinally through said housing member, a lever pivotally supported external of said housing member, means pivotally connecting said thrust member to said lever, a tubular member surrounding said thrust member within said housing member and having an aperture receiving said lever, means on said tubular member engaging said lever, and a helical coil spring surrounding said tubular member and held under compression between said abutment and said tubular member to oppose movement of said thrust member by said wall.

8. In a control device, a mechanism casing having a side wall, a power means casing having a side wall, said power means casing being carried by said mechanism casing so that said side walls are adjacent and substantially parallel, an operating shaft extending through said mechanism casing side wall and having a portion extending external of said mechanism casing side wall and adjacent a second wall of said power means casing, an actuated means, means operatively connecting said shaft and said actuated means, power means within said power means casing, a lever carried by said shaft adjacent said second power casing wall, means operatively connecting said power means to said lever and extending through an aperture in said second wall adjacent said lever, and means in said power means casing having a portion extending through said second wall, said last-named means portion being connected to and acting on said lever to oppose movement of said lever by said power means.

9. In a control device, a housing member, a power element within said housing member, a lever member external of said housing member, a hollow tubular thrust member secured to said power element, said thrust member having an apertured end wall spaced from said power element, a thrust member operatively connected to said lever member and extending through said apertured end wall, said last-named thrust member having a shoulder portion within said tubular thrust member operable to engage said apertured wall, a helically coiled compression spring located within said tubular thrust member and urging said shoulder into engagement with said apertured wall, and resilient means operatively connected to said lever member and acting to oppose movement thereof by said power element.

10. In a control device, a housing member, a power element within said housing member, a lever member external of said housing member, a hollow tubular thrust member secured to said power element, said thrust member having an apertured end wall spaced from said power element, a thrust member operatively connected to said lever member and extending through said apertured end wall, said last-named thrust member having a shoulder portion within said tubular thrust member operable to engage said apertured wall, a helically coiled compression spring located within said tubular thrust member and urging said shoulder into engagement with said apertured wall, a tubular member connected to said lever member and extending into said housing member, an outwardly extending flange on said last-named tubular member within said casing, and spring means interposed between said flange and said casing and acting to oppose movement of said lever member by said power element.

EARNEST J. DILLMAN.